(12) United States Patent
Stephens

(10) Patent No.: US 9,659,278 B2
(45) Date of Patent: May 23, 2017

(54) METHODS, SYSTEMS, AND COMPUTER PROGRAM PRODUCTS FOR DISPLAYING TAG WORDS FOR SELECTION BY USERS ENGAGED IN SOCIAL TAGGING OF CONTENT

(71) Applicant: AT&T Intellectual Property, I, L.P., Atlanta, GA (US)

(72) Inventor: Robert Todd Stephens, Fayetteville, GA (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 436 days.

(21) Appl. No.: 13/660,621

(22) Filed: Oct. 25, 2012

(65) Prior Publication Data

US 2013/0047097 A1  Feb. 21, 2013

Related U.S. Application Data

(63) Continuation of application No. 11/868,688, filed on Oct. 8, 2007, now Pat. No. 8,347,231.

(51) Int. Cl.
*G06F 3/048* (2013.01)
*G06Q 10/10* (2012.01)
*G06F 3/0484* (2013.01)

(52) U.S. Cl.
CPC ......... *G06Q 10/10* (2013.01); *G06F 3/04847* (2013.01)

(58) Field of Classification Search
USPC ........................................ 715/833, 728, 771
See application file for complete search history.

(56) References Cited

U.S. PATENT DOCUMENTS

| | | | |
|---|---|---|---|
| 5,761,655 | A | 6/1998 | Hoffman |
| 5,982,369 | A | 11/1999 | Sciammarella et al. |
| 7,268,773 | B2 | 9/2007 | Ludtke |
| 7,788,592 | B2 * | 8/2010 | Williams et al. ............. 715/764 |
| 7,831,582 | B1 | 11/2010 | Scofield et al. |
| 2002/0107839 | A1 * | 8/2002 | Heckerman ............. G06F 17/18 |
| 2003/0020761 | A1 | 1/2003 | Yanatsubo |
| 2006/0004698 | A1 | 1/2006 | Pyhalammi et al. |
| 2008/0071929 | A1 * | 3/2008 | Motte et al. .................. 709/246 |
| 2008/0231644 | A1 * | 9/2008 | Lempel ................. G06F 17/212 345/689 |

* cited by examiner

*Primary Examiner* — Anil N Kumar
(74) *Attorney, Agent, or Firm* — Myers Bigel, P.A.

(57) ABSTRACT

Methods, systems and computer program products for displaying tag words for selection by users engaged in social tagging of content accessible via a communications network, are provided. A tag cloud, tag word inventory curve and slider control are displayed within a graphical user interface. The tag cloud is a visual representation of an inventory of tag words. The tag word inventory curve is a graphical representation of the words in the inventory by frequency of usage by others. The slider control is responsive to user movement, and is movable within a range that spans the length of the tag word inventory curve. Movement of the slider control changes the number of tag words from the inventory displayed in the tag cloud according to frequency of usage by others.

13 Claims, 9 Drawing Sheets africa amsterdam animals april architecture art asia australia baby barcelona beach berlin birthday black blackandwhite blue boston bw california cameraphone camping canada canon car cat cats chicago china christmas church city clouds color concert d50 day dc de dog england europe family festival film florida flower flowers food france friends fun garden geotagged germany girl graffiti green halloween hawaii hiking holiday home honeymoon hongkong house india ireland island italy japan july june kids la lake landscape light live london losangeles macro march may me mexico mountain mountains museum music nature new newyork newyorkcity newzealand night nikon nyc ocean paris park party people portrait red river roadtrip rock rome san sanfrancisco scotland sea seattle show sky snow spain spring street summer sun sunset sydney taiwan texas thailand tokyo toronto travel tree trees trip uk urban usa vacation vancouver washington water wedding white winter yellow york zoo

Fig. 1

METHODS, SYSTEMS, AND COMPUTER PROGRAM PRODUCTS FOR DISPLAYING TAG WORDS FOR SELECTION BY USERS ENGAGED IN SOCIAL TAGGING OF CONTENT

RELATED APPLICATION

This application is a continuation of U.S. application Ser. No. 11/868,688, filed Oct. 8, 2007, the disclosure of which is hereby incorporated herein by reference as if set forth in its entirety.

FIELD OF THE APPLICATION

The present application relates generally to communications networks, and, more particularly, to methods, systems, and computer program products for obtaining content via communications networks.

BACKGROUND

Communications networks are widely used for nationwide and worldwide communication of voice, multimedia and/or data. As used herein, the term "communications networks" includes public communications networks, such as the Public Switched Telephone Network (PSTN), terrestrial and/or satellite cellular networks, private networks and/or the Internet.

The Internet is a decentralized network of computers that can communicate with one another via Internet Protocol (IP). The Internet includes the World Wide Web (web) service facility, which is a client/server-based facility that includes a large number of servers (computers connected to the Internet) on which web pages or files reside, as well as clients (web browsers), which interface users with the web pages. The topology of the web can be described as a network of networks, with providers of network services called Network Service Providers, or NSPs. Servers that provide application-layer services may be referred to as Application Service Providers (ASPs). Sometimes a single service provider provides both functions.

Vast amounts of information or "content" are available on the web including, but not limited to text, images, applications, video, and audio content. Web users are also increasingly making their own personal content (e.g., home movies, photograph albums, audio recordings, etc.) available via the web through web sites, web logs (blogs), and the like. In addition, television networks, including traditional broadcast networks as well as cable and satellite television networks, are making content available via the web. Unfortunately, the sheer amount of available content and the increasing numbers of content providers are posing increasingly more difficult challenges to users with respect to finding content of interest.

Recent studies have uncovered some alarming facts with regard to how much time and money are spent by enterprise employees engaged in finding information. For example, the average knowledge worker spends 50 percent of his/her time looking for information. The number of copies an organization makes of each document averages 19. In an IDC (www.idc.com) report, entitled "The High Cost of Not Finding Information," it is demonstrated that an enterprise with 1,000 knowledge workers can lose anywhere from $2.5 million $3.5 million annually in intellectual rework, time spent searching for non-existent data, and failing to find existing information. The lost opportunity costs, however, are even greater—an additional $15 million in lost revenues. In another IDC report, entitled "Quantifying Enterprise Search", it was found that only 21% of respondents said they found the information they needed 85% to 100% of the time. 40% of corporate users reported that they can not find the information they need to do their jobs on their enterprise intranets.

The concept of "social tagging" has emerged recently and describes the collaborative activity of marking shared online content with keywords or tags as a way to organize content for future navigation, filtering, or search. Traditional information architecture utilized a central taxonomy or classification scheme in order to place information into specific pre-defined buckets or categories. The assumption was that trained librarians understood more about information content and context than the average user. While this might have been true for the local library with the utilization of the Dewey Decimal system, the enormous amount of content on the Internet makes this type of system un-manageable.

Social tagging offers a number of benefits to the end user community. Perhaps the most important feature to the individual is the ability to bookmark information in a way that is easy to recall at a later date. In addition, by combining social tags, users can create an environment where the opinions of the majority define the appropriateness of the tags themselves. The act of creating a collection of popular tags is referred to as a folksonomy which is defined as a folk taxonomy of important and emerging content within a user community. Unfortunately, a vocabulary problem exists because different users may define content in different ways which may lead to missed information or inefficient user interactions.

An example of social tagging is the Web site "Flickr" (www.flickr.com), which allows users to upload images and "tag" them with appropriate metadata keywords. Other users, who view the images, can also tag them with their concept of appropriate keywords. After a critical mass has been reached, the resulting tag collection will identify images correctly and without bias. Another Web site dedicated to social bookmarking is del.icio.us, which provides users with a place to store, categorize, annotate and share favorite Web pages and files.

Social tagging can be a beneficial way to locate content if users understand the context and tagging of information. On the Internet, where social tagging emerged, there may be a pool of several thousand people engaged in the social tagging of content. Because of the large number of participants, the vocabulary and context of tags utilized will generally be understood by most users. However, in the corporate environment, there may be a much smaller number of users who engage in social tagging of internal content (i.e., content on the corporate intranet) and external content (i.e., content on the Internet). For example, in a large corporation of several thousand people, there may be fewer than one hundred users engaged in social tagging. The vocabulary and context of tags created by the few engaged in social tagging may not be understood by others in the corporation seeking content.

SUMMARY

According to embodiments of the present invention, systems, methods, and computer program products are provided that facilitate the selection of tag words by users engaged in social tagging of content (e.g., text content, audio content, video content, etc.) that is accessible via a communications network. By allowing users to select from a common tag word inventory and then adjust displayed tag words by frequency of use, embodiments of the present invention facilitate more standardized tags that can enable users to better locate content than before, which may lower the cost of doing business and finding information. Embodiments of the present invention allow users to understand how increasing or reducing the domain of tag words relative to a tag word inventory curve will impact tag words displayed within the tag cloud According to some embodiments of the present invention, a method of displaying tag words for selection by users engaged in social tagging of content accessible via a communications network, includes displaying a tag cloud, wherein the tag cloud is a visual representation of an inventory of tag words, displaying a slider control adjacent to the tag cloud, and displaying a tag word inventory curve adjacent to the slider control. The tag word inventory curve is a graphical representation of the words in the inventory by popularity (i.e., frequency of usage by others). The slider control is responsive to user movement, and is movable within a range that spans the length of the tag word inventory curve. Movement of the slider control changes the number of tag words from the inventory displayed in the tag cloud according to frequency of usage by others. For example, movement of the slider control to one end of the tag word inventory curve causes all tag words in the tag word inventory to be displayed. Movement of the slider control to the opposite end of the tag word inventory curve causes only the most popular (i.e., most frequently used) tag words in the tag word inventory to be displayed.

According to other embodiments of the present invention, two slider controls may be displayed adjacent to a displayed tag word inventory curve and tag cloud. The two slider controls define a range of popularity on the tag word inventory curve, and only tag words in the defined range of popularity (i.e. , between the two slider controls) are displayed within the tag cloud.

According to other embodiments of the present invention, a data processing system that displays tag words for selection by users engaged in social tagging of content accessible via a communications network includes a display and a graphical user interface (GUI) displayed within the display that allows users to view and select tag words. The GUI includes a tag cloud, a tag word inventory curve displayed adjacent to the tag cloud, a slider control positioned adjacent to the tag word inventory curve and tag cloud, and a tag word selection field displayed adjacent to the tag cloud. The tag cloud is a visual representation of an inventory of tag words. The tag word inventory curve is a graphical representation of the words in the inventory by popularity (i.e., by frequency of usage by others engaged in social tagging). The tag word selection field displays one or more tag words selected by a user from the displayed tag cloud.

In some embodiments, tag words are displayed alphabetically in the tag cloud. In addition, tag words with higher popularity (i.e., tag words with greater frequency of use) are displayed differently from tag words with lesser popularity (i.e., tag words with lower frequency of use). For example, tag words with higher popularity may be displayed in a larger and/or different font than tag words with lesser popularity.

The slider control is responsive to user movement, and is movable within a range that spans the length of the tag word inventory curve. Movement of the slider control changes the number of tag words from the inventory displayed in the tag cloud.

According to other embodiments of the present invention, the GUI may include two slider controls displayed adjacent to the displayed tag word inventory curve and tag cloud. The two slider controls define a range of popularity on the tag word inventory curve, and only tag words in the defined range of popularity (i.e., between the two slider controls) are displayed within the tag cloud.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which form a part of the specification, illustrate key embodiments of the present invention. The drawings and description together serve to fully explain the invention.

FIG. 1 illustrates a tag cloud that may be utilized in accordance with embodiments of the present invention.

DETAILED DESCRIPTION

Figure 2:
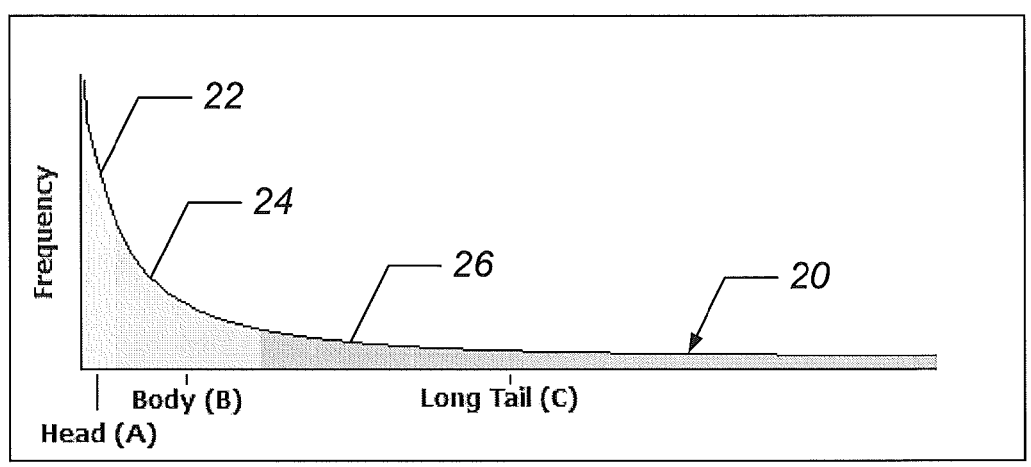
FIG. 2 illustrates a content word inventory curve, referred to as a "long tail" curve.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, steps, operations, elements, and/or components, but does not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items. As used herein, the terms "tag words" and "tag keywords" are interchangeable.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as systems, methods, and/or computer program products. Accordingly, the present invention may be embodied in hardware and/or in software, including firmware, resident software, microcode, etc. Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

As used herein, the term "content" means any type of audio content, video content, audio/video content, text, gaming content, interactive content, application content, etc., that can be delivered and/or performed/displayed via a communications network. For example, content may include television programs, movies, voice messages, music and other audio files, electronic mail/messages, web pages, interactive games, educational materials, software applications, etc.

Computer program code for carrying out operations of data processing systems discussed herein may be written in a high-level programming language, such as Java, AJAX (Asynchronous JavaScript), C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. Embodiments of the present invention are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for displaying tag words for selection by users engaged in social tagging of content via a communications network, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

FIG. 1 illustrates an exemplary tag cloud 10 that is a visual representation of an inventory of content tag words. Tag clouds are utilized by users engaged in social tagging. For example, a user selects one or more words from a tag cloud for tags the user wishes to associate with certain content. In the illustrated tag cloud 10, more frequently used tag words in the inventory are depicted in a larger font or are otherwise emphasized, while the displayed order is generally alphabetical. Thus, the illustrated tag cloud 10 facilitates finding and selecting tag words both alphabetically and by popularity. However, embodiments of the present invention may utilize tag clouds having various configurations. Embodiments of the present invention are not limited to the illustrated tag cloud configuration.

FIG. 2 illustrates the distribution of content tag words in an inventory of tag words according to popularity, and is referred to as a "long tail" curve 20. The long tail curve 20 graphically illustrates that a few words in the tag cloud 10 are popular content tag words (i.e., a small percentage of content tag words make up a large percentage of use), and that the majority of the content tag words in the tag cloud 10 are spread out (i.e., utilization of these words drops). The illustrated long tail curve 20 has three delineated areas: the head 22, the body 24, and the long tail 26. The head 22 represents the most popular (e.g., about the top 2-5%) words in the inventory. The body 24 represents the next most popular (e.g., about the top 10-20%) words in the inventory. The long tail 26 contains the remaining (e.g., about 80-85%) words in the inventory.

Referring to FIGS. 3-9, methods, systems and computer program products for displaying tag words for selection by users engaged in social tagging of content, according to embodiments of the present invention, are illustrated. For example, a user engaged in social tagging searches for and/or accesses, via a client device 30, content at one or more content sources 40 connected to a communications network 50. A content source 40 may be any source of content that can be accessed by a user e.g., web pages, databases, archives, etc. Content at a content source 40 may include any type of content e.g., text, images, applications, video, and audio content, etc.

The communications network 50 may represent a global network, such as the Internet, or other publicly accessible network. The communications network 50 may also, however, represent a wide area network, a local area network, an Intranet, or other private network, which may not accessible by the general public. Furthermore, the communications network 50 may represent a combination of public and private networks or a virtual private network (VPN). The communications network 50 may also contain transmissions over-the-air or through a dedicated distribution network. The communications network 50 may also be wireless or wireline, or may include wireless and wireline portions. Exemplary user client devices 30 are devices executing a browser application, such as a personal computer, wireless communications device, and/or packet-based network video device.

Figure 3:
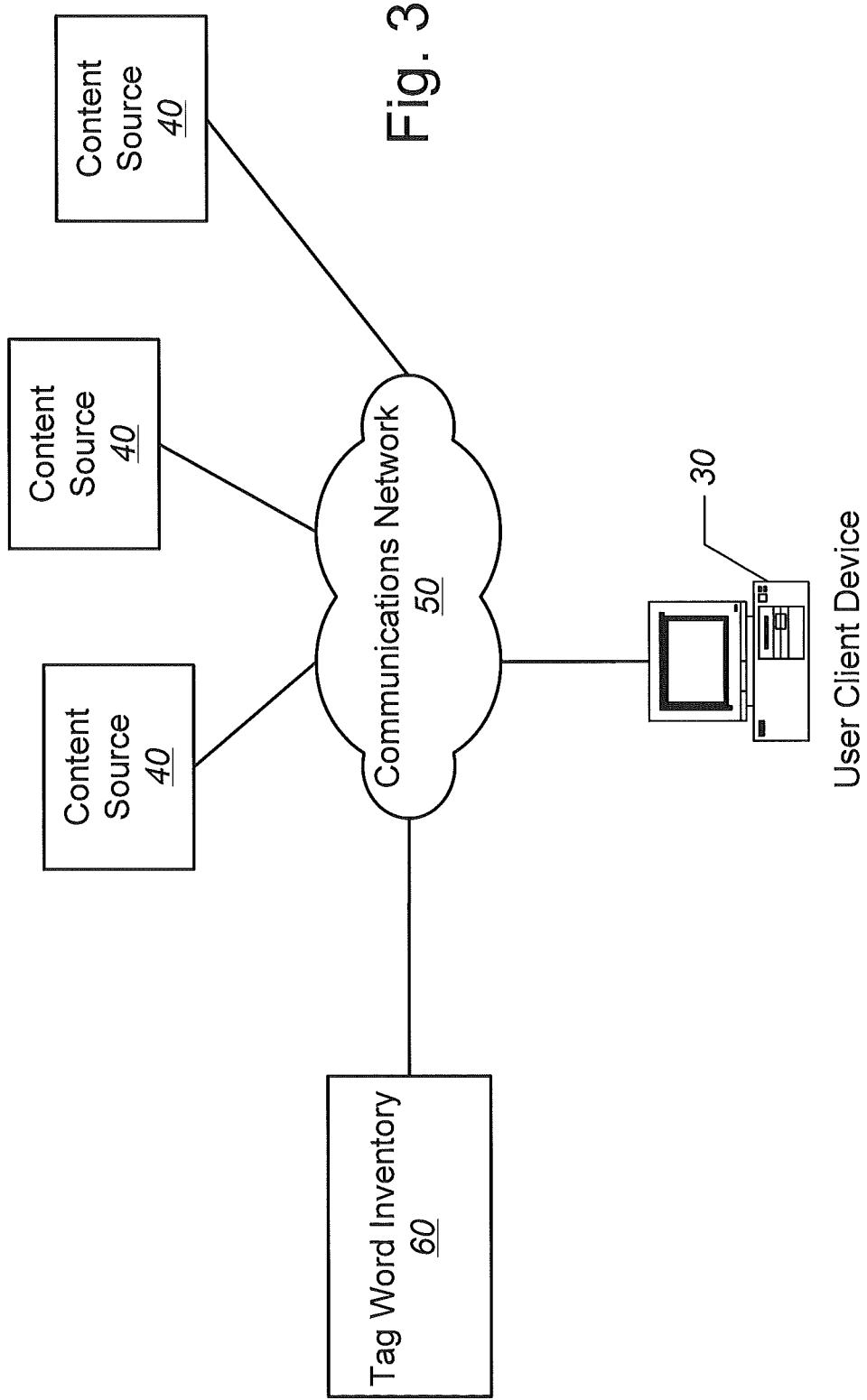
FIG. 3 is a block diagram that illustrates a software/hardware architecture for displaying tag words for selection by users engaged in social tagging of content accessible via a communications network, according to some embodiments of the present invention.
Figure 4:
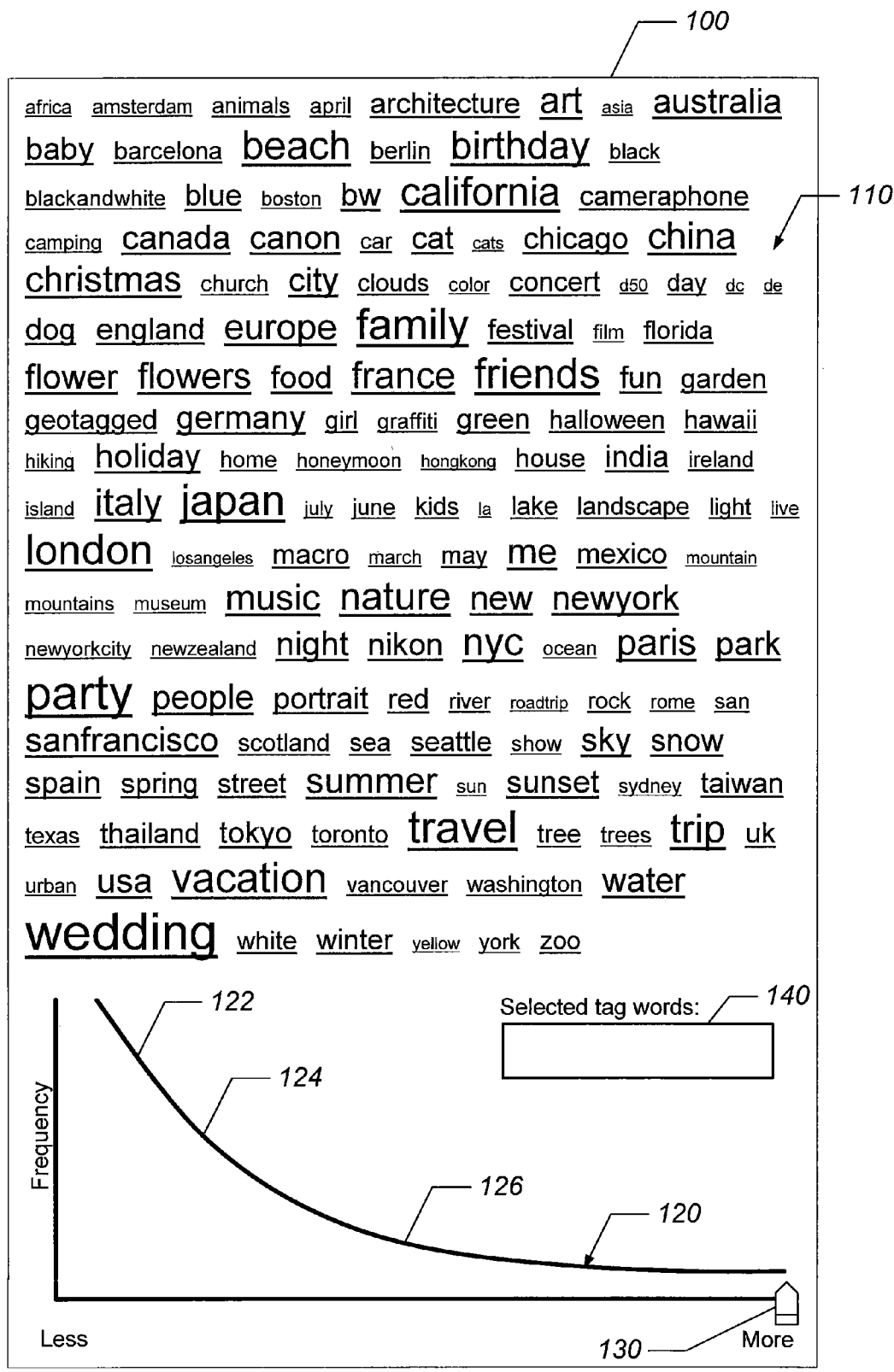
FIGS. 4-7 illustrate a user interface for selecting tag words, according to some embodiments of the present invention.

FIG. 4 illustrates a graphical user interface (GUI) 100 displayed on a user client device 30, according to some embodiments of the present invention. The illustrated GUI 100 includes a tag cloud 110, a tag word inventory curve 120 positioned adjacent to the tag cloud 110, and a slider control 130 operably associated with the tag cloud 110 and tag word inventory curve 120. As described above, the tag cloud 110 is a visual representation of an inventory of tag words 60 (FIG. 3). The tag word inventory curve 120 is a graphical representation of the tag words in the inventory by popularity. As described above with respect to FIG. 2, the tag word inventory curve 120 includes a head portion 122, a body portion 124, and a long tail portion 126. The head portion 122 represents an upper percentile of tag word popularity (i.e., tag words with the highest frequency of use), the body portion 124 represents an intermediate percentile of tag word popularity (i.e., tag words with a lower frequency of use), and the long tail portion 126 represents a lower percentile of tag word popularity (i.e., tag words with the lowest frequency of use).

In the illustrated embodiment, the tag cloud 110 displays tag words from the inventory alphabetically. In addition, tag words with higher popularity are displayed differently from tag words with lesser popularity. For example, tag words that fall under the head 122 of the tag word inventory curve 120 are displayed in a larger font than tag words that fall under the long tail 126 of the tag word inventory curve 120. For example, the tag. word "wedding" is displayed in a larger font than the tag word "mountain." This indicates that the tag word "wedding" is a more popular tag word than "mountain."

Figure 7:
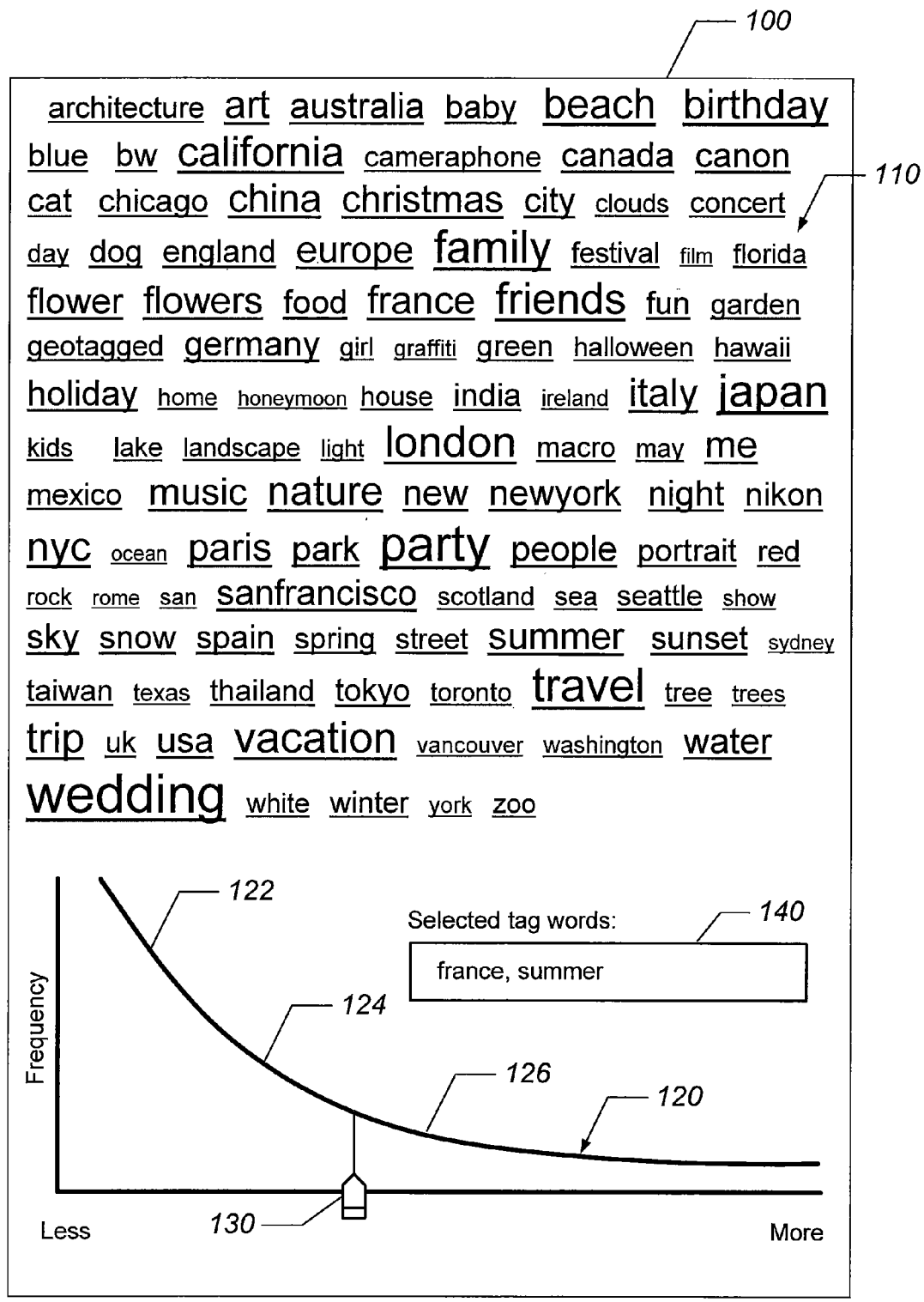

A user engaged in social tagging utilizes the tag cloud 110 to select words for inclusion within tags associated with content. A tag word selection field 140 is positioned adjacent to the tag cloud, as illustrated. The tag word selection field 140 displays one or more tag words selected by a user from the displayed tag cloud 110 (FIG. 7). The slider control 130 is movable within a range (i.e., between opposite end portions of the tag word inventory curve 120) and increases or decreases the number of tag words displayed.

Figure 5:
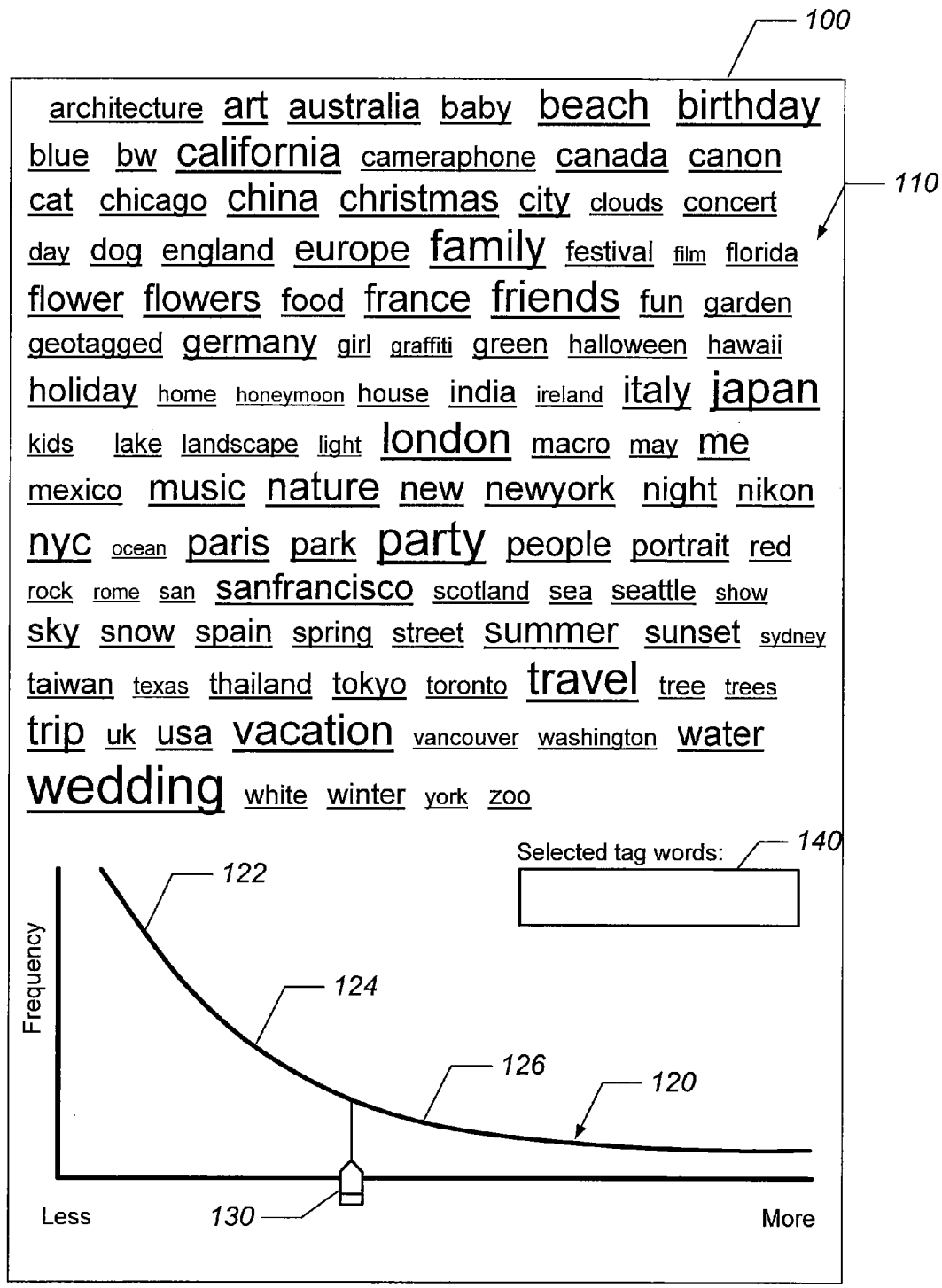

For example, in FIG. 4, the slider control 130 is positioned at the far right of the tag word inventory curve and all of the tag words in the inventory are displayed as a result. In FIG. 5, the slider control has been moved to the left and the number of displayed tag words has been decreased. Only the tag words that correspond to the range that extends between the far left of the tag word inventory curve and the location of the slider control 130 are displayed. In other words, tag words with a popularity that falls on the right hand side of the slider control 130 are not displayed.

Figure 6:
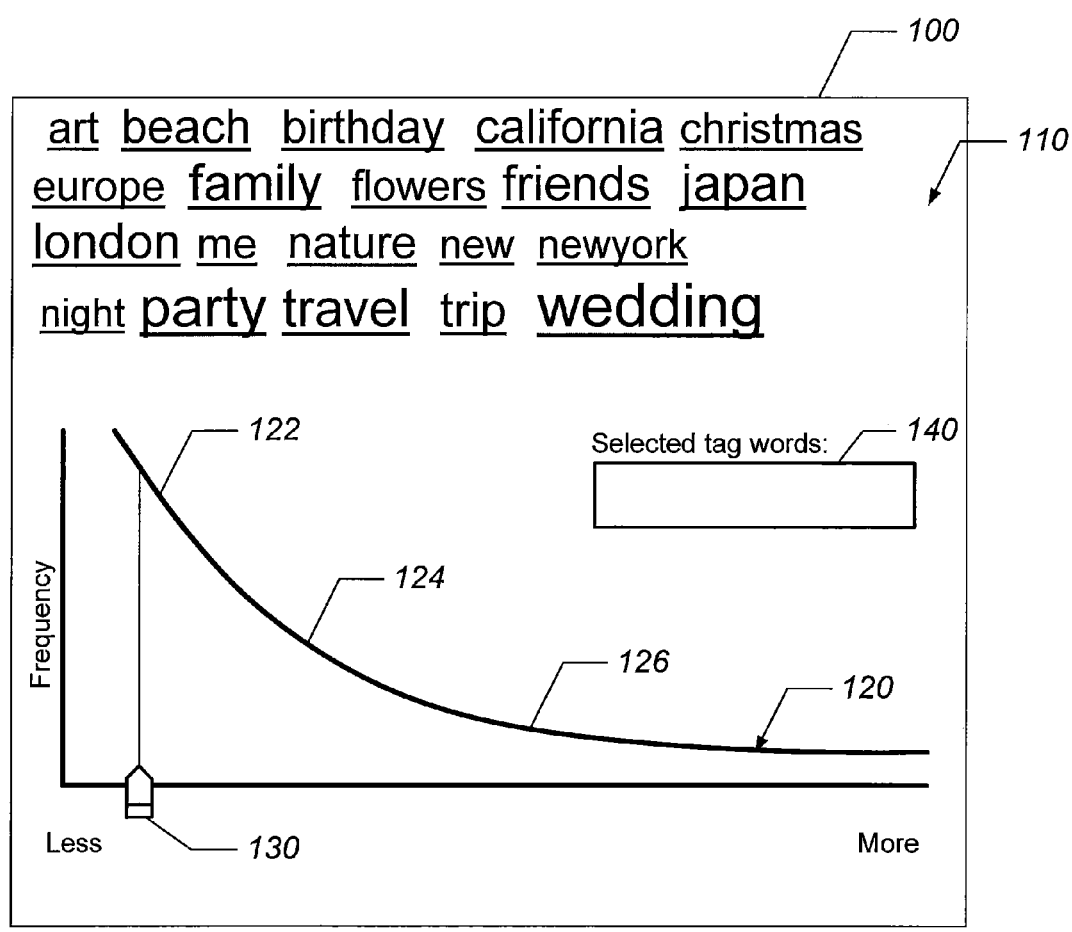

In FIG. 6 the slider control 130 has been moved further to the left and the number of displayed tag words has been decreased, correspondingly. Only the tag words that correspond to the range that extends between the far left of the tag word inventory curve and the location of the slider control 130 are displayed. In other words, tag words with a popularity that falls on the right hand side of the slider control 130 are not displayed. The displayed tag words in FIG. 6 are the ones most often used in social tagging by others (i.e., these tag words fall under the head portion of the tag word inventory curve).

Embodiments of the present invention allow users to understand how increasing or reducing the domain of tag words relative to a tag word inventory curve 120 will impact tag words displayed within the tag cloud 110. User movement of the slider control 130 allows a user to visualize tag words displayed within a tag cloud according to their frequency of use by others engaged in social tagging.

Figure 8:
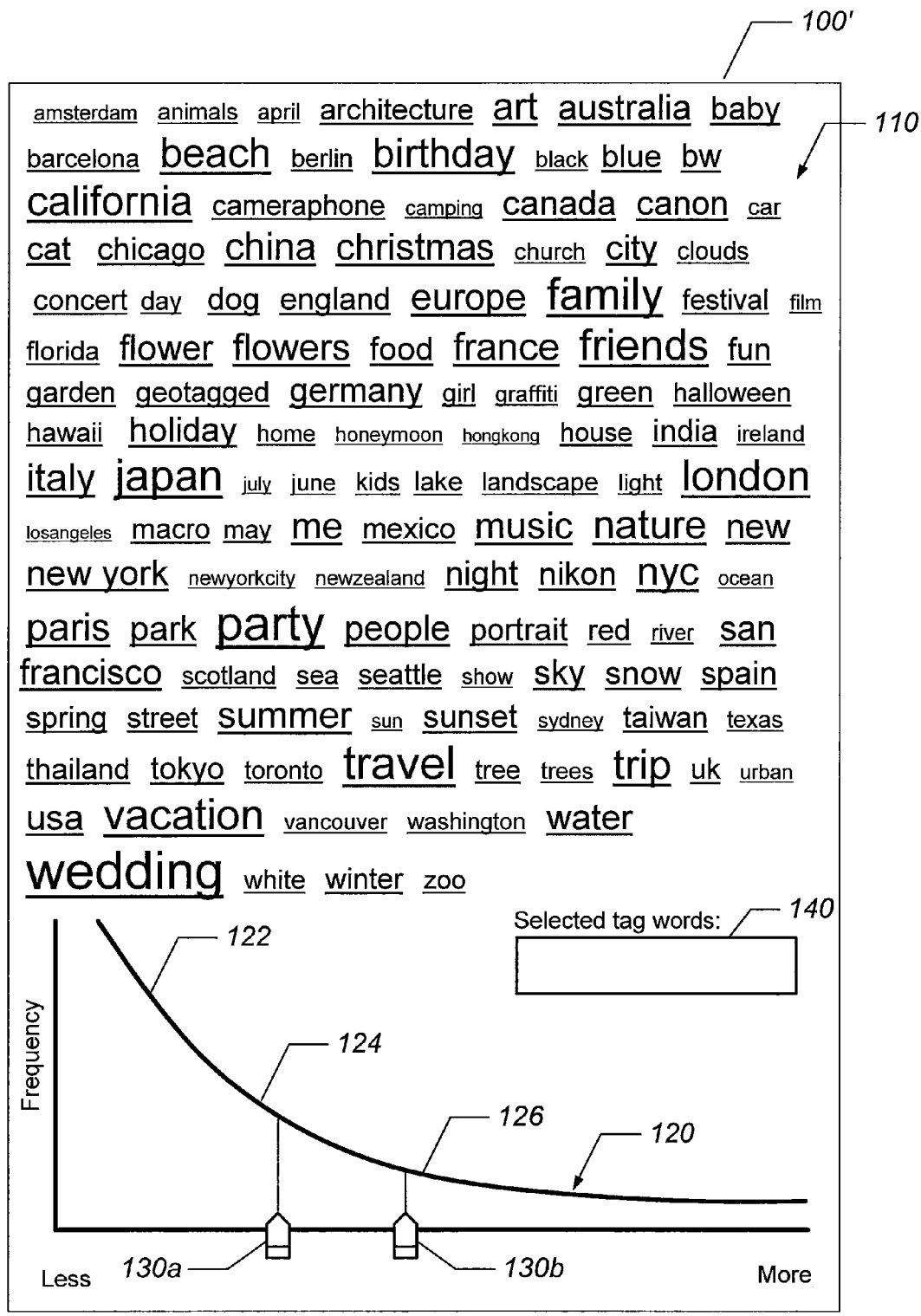
FIG. 8 illustrates a user interface for selecting tag words, according to other embodiments of the present invention.

FIG. 8 illustrates a graphical user interface (GUI) 100' displayed on a user client device 30, according to other embodiments of the present invention. The illustrated GUI 100' includes a tag cloud 110, a tag word inventory curve 120 positioned adjacent to the tag cloud 110, and a pair of slider controls 130a, 130b operably associated with the tag cloud 110 and tag word inventory curve 120. The slider controls 130a, 130b are movable within a range (i.e., between opposite end portions of the tag word inventory curve 120). Only tag words that fall within the range between the two slider controls 130a, 130b are displayed. In other words, tag words with a popularity that falls on the right hand side of the slider control 130b are not displayed and tag words with a popularity that falls on the left hand side of the slider control 130a are not displayed.

Figure 9:
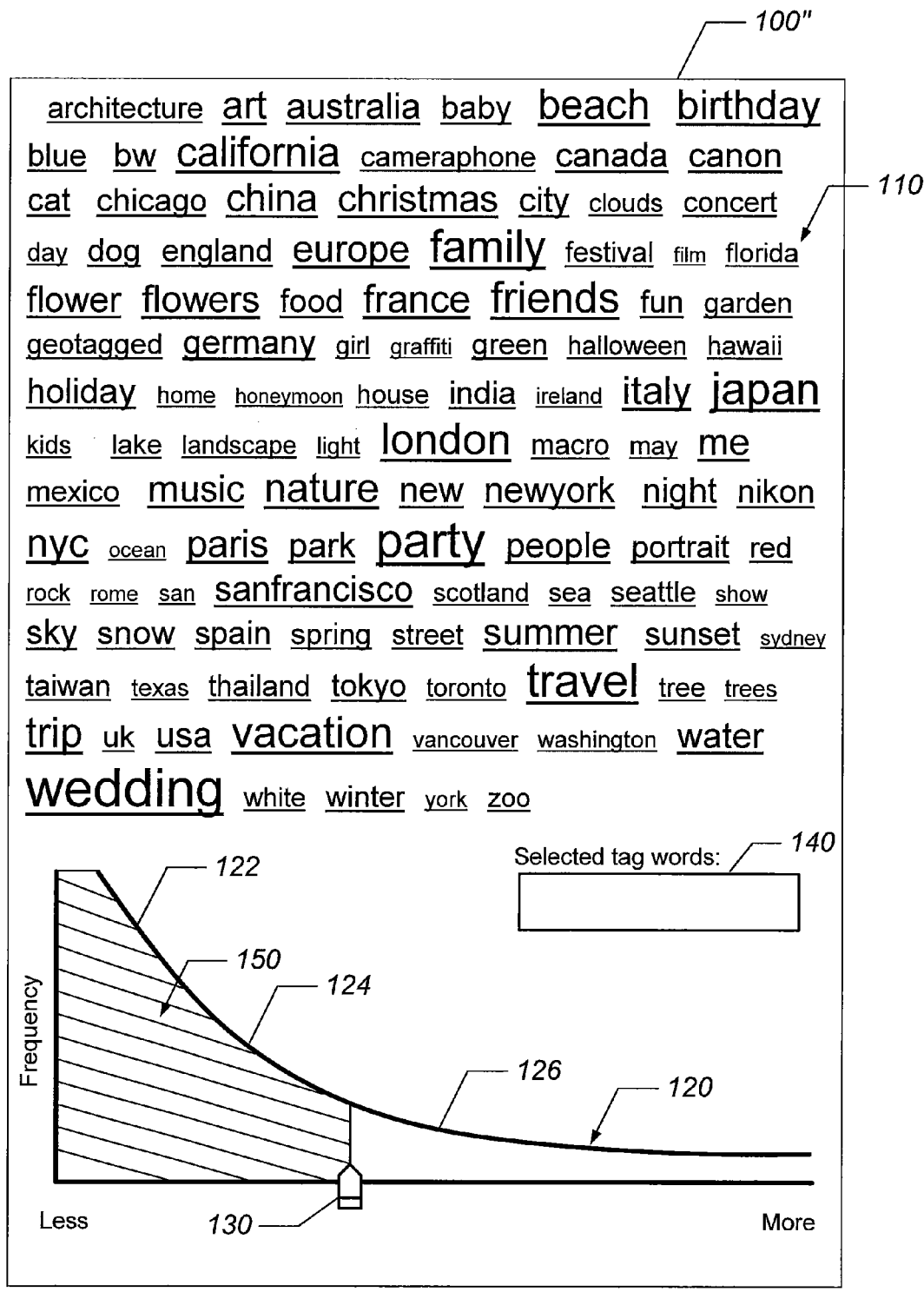
FIG. 9 illustrates a user interface for selecting tag words, according to other embodiments of the present invention.

FIG. 9 illustrates a graphical user interface (GUI) 100" displayed on a user client device 30, according to other embodiments of the present invention. The illustrated GUI 100" includes a tag cloud 110, a tag word inventory curve 120 positioned adjacent to the tag cloud 110, and a slider control 130 operably associated with the tag cloud 110 and tag word inventory curve 120. As described above, the displayed tag words correspond to the range that extends between the far left of the tag word inventory curve 120 and the location of the slider control 130. In the illustrated embodiment, this range is highlighted by shading 150 under the tag word inventory curve 120.

Software code for displaying the various GUI embodiments described above may reside and/or execute entirely on a server device connected to the communications network 50 (or as part of a network service available via the communications network), entirely on a user device 30 (e.g., within a browser application, etc.), or partially on a network service (or partially as part of a network service) and a user device 30.

Many variations and modifications can be made to the preferred embodiments without substantially departing from the principles of the present invention. All such variations and modifications are intended to be included herein within the scope of the present invention, as set forth in the following claims.

That which is claimed:

1. A method of displaying tag words for selection by a user engaged in social tagging of content accessible via a communications network, comprising:

displaying a tag cloud within a graphical user interface (GUI) displayed on a device, wherein the tag cloud is a visual representation of an inventory of the tag words, wherein each of the tag words is a metadata keyword that can be selected and associated with the content by the user;

displaying a long tail tag word inventory curve within the GUI directly adjacent to the tag cloud, wherein the long tail tag word inventory curve terminates at a left end and an opposite right end, wherein the long tail tag word inventory curve extends continuously downward from the left end to the right end, wherein the long tail tag word inventory curve comprises a head portion, a body portion, and a long tail portion, and wherein the head portion represents an upper percentile of tag word popularity, the body portion represents an intermediate percentile of tag word popularity, and the long tail portion represents a lower percentile of tag word popularity;

displaying a slider control within the GUI directly adjacent to the long tail tag word inventory curve, wherein the slider control is operably associated with the tag cloud and with the long tail tag word inventory curve and is responsive to user movement, and wherein movement of the slider control changes a number of the tag words from the inventory displayed in the tag cloud; and displaying a tag word selection field adjacent to the tag cloud, wherein the tag word selection field displays tag words selected directly from the tag cloud by the user.

2. The method of claim 1, wherein the slider control is movable within a range, and wherein all of the tag words in the inventory are displayed in the tag cloud when the slider control is positioned at one end of the range.

3. The method of claim 1, further comprising displaying an additional slider control adjacent to the long tail tag word inventory curve, wherein the additional slider control is operably associated with the tag cloud and with the long tail tag word inventory curve and is responsive to user movement, and wherein movement of the additional slider control changes the number of the tag words displayed in the tag cloud.

4. The method of claim 3, wherein the two slider controls define a range of popularity on the long tail tag word inventory curve, and wherein only the tag words in the defined range of popularity are displayed within the tag cloud.

5. The method of claim 1, wherein tag words with higher popularity are displayed differently from tag words with lesser popularity.

6. A computer program product for displaying tag words for selection by a user engaged in social tagging of content accessible via a communications network, comprising:

a tangible non-transitory computer readable storage medium embodying a program executable with computer instructions, wherein the computer instructions comprise means for enabling a processor to perform operations comprising:

displaying a tag cloud within a graphical user interface (GUI) displayed on a device, wherein the tag cloud is a visual representation of an inventory of the tag words, wherein each of the tag words is a metadata keyword that can be selected and associated with the content by the user;

displaying a long tail tag word inventory curve within the GUI directly adjacent to the tag cloud, wherein the long tail tag word inventory curve terminates at a left end and an opposite right end, wherein the long tail tag word inventory curve extends continuously downward from the left end to the right end, wherein the long tail tag word inventory curve comprises a head portion, a body portion, and a long tail portion, and wherein the head portion represents an upper percentile of tag word popularity, the body portion represents an intermediate percentile of tag word popularity, and the long tail portion represents a lower percentile of tag word popularity; and displaying a slider control within the GUI directly adjacent to the long tail tag word inventory curve, wherein the slider control is operably associated with the tag cloud and with the long tail tag word inventory curve and is responsive to user movement, and wherein movement of the slider control changes a number of the tag words from the inventory displayed in the tag cloud; and displaying a tag word selection field adjacent to the tag cloud, wherein the tag word selection field displays tag words selected directly from the tag cloud by the user.

7. The computer program product of claim 6, wherein the operations further comprise displaying an additional slider control adjacent to the long tail tag word inventory curve, wherein the additional slider control is operably associated with the tag cloud and with the long tail tag word inventory curve and is responsive to user movement, and wherein movement of the additional slider control changes the number of the tag words displayed in the tag cloud.

8. The computer program product of claim 7, wherein the two slider controls define a range of popularity on the long tail tag word inventory curve, and wherein only the tag words in the defined range of popularity are displayed within the tag cloud.

9. The computer program product of claim 6, wherein the operations further comprise displaying tag words with higher popularity differently from tag words with lesser popularity.

10. A data processing system that displays tag words for selection by a user engaged in social tagging of content accessible via a communications network, comprising:

a display; and a processor in communication with the display to display a graphical user interface (GUI) within the display, the graphical user interface comprising:

a tag cloud, wherein the tag cloud is a visual representation of an inventory of the tag words, wherein each tag word is a metadata keyword that can be selected and associated with the content by the user;

a long tail tag word inventory curve directly adjacent to the tag cloud, wherein the long tail tag word inventory curve terminates at a left end and an opposite right end, wherein the long tail tag word inventory curve extends continuously downward from the left end to the right end, wherein the long tail tag word inventory curve comprises a head portion, a body portion, and a long tail portion, and wherein the head portion represents an upper percentile of tag word popularity, the body portion represents an intermediate percentile of tag word popularity, and the long tail portion represents a lower percentile of tag word popularity; and a slider control displayed directly adjacent to the long tail tag word inventory curve, wherein the slider control is operably associated with the tag cloud and with the long tail tag word inventory curve and is responsive to user movement, and wherein movement of the slider control changes a number of the tag words from the inventory displayed in the tag cloud;

a tag word selection field adjacent to the tag cloud, wherein the tag word selection field displays tag words selected directly from the tag cloud by the user.

11. The data processing system of claim 10, wherein the slider control is movable within a range, and wherein all of the tag words in the inventory are displayed in the tag cloud when the slider control is positioned at one end of the range.

12. The data processing system of claim 10, wherein the graphical user interface comprises an additional slider control displayed adjacent to the long tail tag word inventory curve, wherein the additional slider control is operably associated with the tag cloud and with the long tail tag word inventory curve and is responsive to user movement, and wherein movement of the additional slider control changes the number of the tag words displayed in the tag cloud.

13. The data processing system of claim 12, wherein the two slider controls define a range of popularity on the long tail tag word inventory curve, and wherein only the tag words in the defined range of popularity are displayed within the tag cloud.

\* \* \* \* \*